(12) United States Patent
Weh et al.

(10) Patent No.: US 10,507,812 B2
(45) Date of Patent: Dec. 17, 2019

(54) PEDAL TRAVEL SIMULATOR AND HYDRAULIC BLOCK INCLUDING A PEDAL TRAVEL SIMULATOR

(71) Applicant: Robert Bosch GmbH, Stuttgart (DE)

(72) Inventors: Andreas Weh, Sulzberg (DE); Harald Guggenmos, Immenstadt/Seifen (DE); Matthias Mayr, Rettenberg (DE); Stefan Kaserer, Ofterschwang (DE)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 16/002,117

(22) Filed: Jun. 7, 2018

(65) Prior Publication Data
US 2018/0362006 A1 Dec. 20, 2018

(30) Foreign Application Priority Data
Jun. 14, 2017 (DE) .................. 10 2017 210 041

(51) Int. Cl.
| | |
|---|---|
| *B60T 8/34* | (2006.01) |
| *B60T 8/40* | (2006.01) |
| *G05G 5/03* | (2008.04) |
| *F15B 15/14* | (2006.01) |
| *F15B 15/24* | (2006.01) |
| *B61H 1/00* | (2006.01) |
| *B60T 7/04* | (2006.01) |

(52) U.S. Cl.
CPC .............. *B60T 8/409* (2013.01); *B60T 7/042* (2013.01); *B61H 1/00* (2013.01); *F15B 15/1428* (2013.01); *F15B 15/24* (2013.01); *G05G 5/03* (2013.01); *B60T 8/4086* (2013.01); *B60T 2270/82* (2013.01)

(58) Field of Classification Search
CPC .............................. B60T 8/4086; B60T 8/409
See application file for complete search history.

(56) References Cited

U.S. PATENT DOCUMENTS 7,350,882 B2 * 4/2008 Kamiya .................. B60T 7/065
303/157

* cited by examiner

*Primary Examiner* — F Daniel Lopez
(74) *Attorney, Agent, or Firm* — Norton Rose Fulbright US LLP; Gerard Messina

(57) ABSTRACT

A pedal travel simulator for a hydraulic vehicle power braking system with a cup-shaped cylinder cover in which a piston spring is accommodated, which is held by an orifice disk as a stop for a piston of the pedal travel simulator in the cylinder cover. Recesses are provided in an outer edge of the orifice disk, through which the piston is able to displace brake fluid on its rear side out of a cylinder of the pedal travel simulator through a circumferential groove into a return.

11 Claims, 2 Drawing Sheets

PEDAL TRAVEL SIMULATOR AND HYDRAULIC BLOCK INCLUDING A PEDAL TRAVEL SIMULATOR

CROSS REFERENCE

The present application claims the benefit under 35 U.S.C. § 119 of German Patent Application No. DE 102017210041.9 filed on Jun. 14, 2017, which is expressly incorporated herein by reference in its entirety.

SUMMARY

The present invention relates to a pedal travel simulator.

BACKGROUND INFORMATION

Pedal travel simulators make a pedal travel (a lever travel in the case of a parking brake) possible in power-operated hydraulic vehicle braking systems upon an actuation of a master brake cylinder. With power operation, the master brake cylinder serves as a setpoint generator for a hydraulic braking pressure, which is not generated by the master brake cylinder, but by external energy, for example using a hydraulic pump. In the case of power braking, the master brake cylinder is hydraulically disconnected from the vehicle braking system, for example by the closing of a valve, and upon its actuation displaces brake fluid into the pedal travel simulator.

A pedal travel simulator usually includes a cylinder and a piston displaceable in the cylinder, as well as a piston spring, which acts on the piston counter to a pressure application from the master brake cylinder. With a power operation of a vehicle braking system, the pedal travel simulator is hydraulically connected to a master brake cylinder, which upon its actuation displaces brake fluid into the cylinder of the pedal travel simulator, whereby the piston is displaced counter to a spring force of the piston spring in the cylinder of the pedal travel simulator.

SUMMARY

An example pedal travel simulator according to the present invention includes a cylinder, a piston displaceable in the cylinder, and a hollow cylinder cover, which closes the cylinder on an end face of the piston referred to as the rear side here. A piston spring that pushes against the rear side of the piston is situated in the cylinder cover. Hollow shall be understood to mean a shape of the cylinder cover which is suitable for accommodating the piston spring and, if necessary, extends the cylinder. An orifice disk forms a stroke limiter of the piston. It rests axially against an annular step in the cylinder and is held axially against the annular step in the cylinder by an edge of the cylinder cover on an open side of the cylinder cover. The piston extends through a center hole of the orifice disk forming the stroke limiter in any case when it carries out a stroke. In order to limit the stroke, the piston has an annular step, which during a maximum stroke of the piston strikes against the orifice disk forming the stroke limiter, whereby the stroke of the piston is limited.

On a front side of the piston situated opposite the rear side, the cylinder includes a connection for a master brake cylinder, which may also be interpreted as an inlet and an outlet of the cylinder of the pedal travel simulator. The piston spring acts on the piston of the pedal travel simulator counter to an application of hydraulic pressure from a master brake cylinder.

A circumferential groove in the cylinder surrounds the orifice disk forming the stroke limiter for the piston. The groove is inwardly open toward the cylinder, and it communicates with the cylinder on the rear side of the piston. A return opens into the groove so that the piston is able to displace a fluid on its rear side from the cylinder through the groove and the return.

Advantageous embodiments and refinements of the present invention are described herein.

The pedal travel simulator is preferably integrated into a hydraulic block of a slip control unit of a hydraulic vehicle braking system, in particular a power vehicle braking system. Hydraulic blocks are generally conventional, and they are usually cuboid-shaped metal blocks which are drilled in accordance with a hydraulic diagram of the vehicle braking system and/or of the slip control unit of a vehicle braking system. The hydraulic blocks are equipped with solenoid valves, hydraulic pumps and further hydraulic components of the slip control unit. Such hydraulic blocks are conventional and are not discussed in greater detail here.

BRIEF DESCRIPTION OF THE DRAWINGS

The present invention is described in greater detail below based on one specific embodiment shown in the figures.

DETAILED DESCRIPTION OF EXAMPLE EMBODIMENTS

Figure 1:
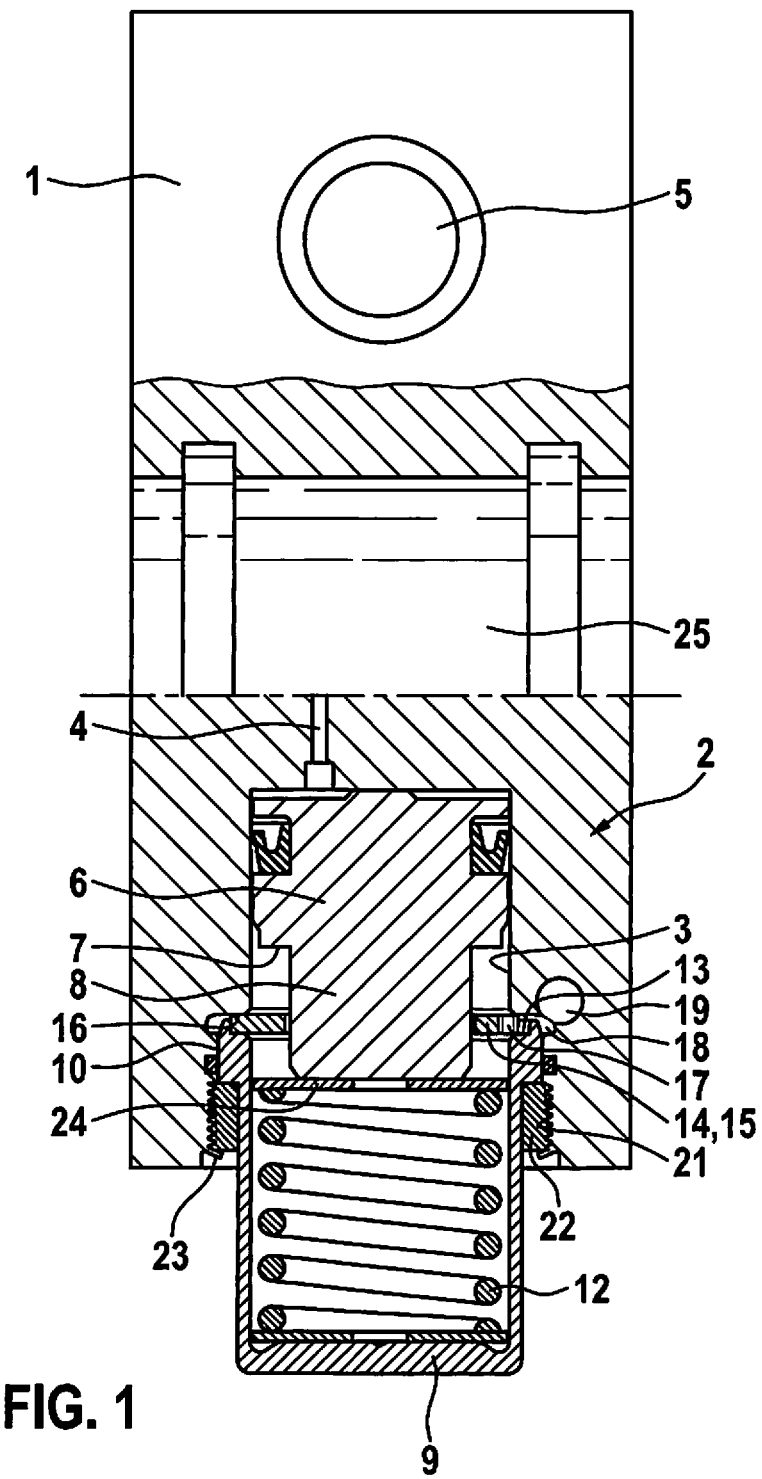
FIG. 1 shows a longitudinal section of an example hydraulic block of a slip control unit of a hydraulic power vehicle braking system including a pedal travel simulator according to the present invention.

The hydraulic block 1 according to the present invention shown in FIG. 1 is provided for a slip control unit and a power operation of a hydraulic power vehicle braking system, which is not additionally shown. Hydraulic block 1 is a cuboid-shaped metal block which, with the exception of a pedal travel simulator 2 to be described, is shown unequipped. In the shown and described specific embodiment, hydraulic block 1 is made up of light metal, namely an aluminum alloy. Hydraulic block 1 has boreholes corresponding to a hydraulic diagram of a vehicle braking system, which are not visible in the drawing. It is equipped with hydraulic components for power operation, which are not shown, and the slip control unit, such as solenoid valves, a master brake cylinder including one or multiple piston(s), a power cylinder including a piston, and pedal travel simulator 2, which are hydraulically interconnected corresponding to the hydraulic diagram of the vehicle braking system via the boreholes. Since a master brake cylinder is integrated into hydraulic block 1, only hydraulic wheel brakes have to be connected to hydraulic block 1 via brake lines. Such hydraulic blocks 1 are conventional and are not discussed in greater detail here.

Hydraulic block 1 includes a cylindrical blind hole serving as cylinder 3 of pedal travel simulator 2, into whose base a borehole opens as connection 4 for a master brake cylinder. On an end face of a piston 6 referred to as the front side here, the borehole forming connection 4 hydraulically connects cylinder 3 of pedal travel simulator 2 to a master brake cylinder borehole 5. Piston 6 is axially displaceable in cylinder 3 and includes an annular step as an axial stop 7, at which it transitions into an extension 8 having a smaller diameter.

A hollow cylinder cover 9, which in the specific embodiment is cup-shaped and closed at one end, is pressed into an opening of cylinder 3 of pedal travel simulator 2 and, due to a press fit 10 on its circumference, seals the cylinder on a rear side of piston 6 situated opposite the front side in a pressure-tight manner. A helical compression spring serving as piston spring 12 is accommodated in cylinder cover 9. Piston spring 12 is supported in cylinder cover 9 and pushes against the rear side of piston 6 of pedal travel simulator 2, and pushes the front side of piston 6 against the base of cylinder 3.

At an end edge on an open side facing cylinder 3, cylinder cover 9 includes an annular step as a receptacle 13 for an orifice disk 14. Orifice disk 14 is pressed into the annular step forming receptacle 13 and holds piston spring 12 in cylinder cover 9. In this way, cylinder cover 9, together with piston spring 12 held therein and orifice disk 14, forms a sub-assembly, which may be assembled independently of the remaining parts, handled like an individual part and assembled with pedal travel simulator 2 by press-fitting into the opening of cylinder 3 of pedal travel simulator 2.

Extension 8 of piston 6 extends through a center hole of orifice disk 14. When piston 6 carries out a stroke counter to a spring force of piston spring 12 away from the base of cylinder 3, the annular step of piston 6 forming axial stop 7 strikes against orifice disk 14, which in this way limits the stroke of piston 6 and is therefore also referred to as stroke limiter 15.

Orifice disk 14 is thicker than the annular step forming receptacle 13 for orifice disk 14 in the end edge on the open side of cylinder cover 9 is deep, so that orifice disk 14 protrudes over the end edge of cylinder cover 9. Orifice disk 14 rests axially against an annular step 16 in cylinder 3 and is held there axially by the end edge of cylinder cover 9. Since orifice disk 14 is thicker than receptacle 13 is deep and protrudes over the end edge of cylinder cover 9, the end edge of cylinder cover 9 has a distance from a base of annular step 16 in cylinder 3, against which orifice disk 14 rests axially.

Figure 2:
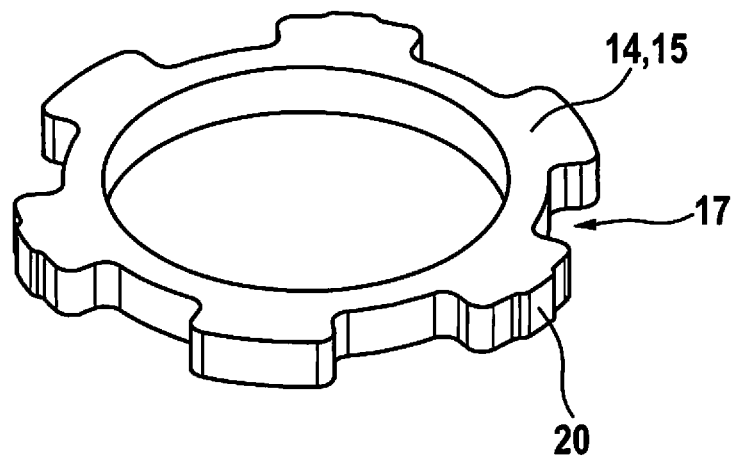
FIG. 2 shows an orifice disk as a stroke limiter for a piston of the pedal travel simulator from FIG. 1 in a perspective representation.

As is apparent in FIG. 2, orifice disk 14 includes recesses 17 in its outer edge, which extend so far inwardly that brake fluid, or fluid in general, in cylinder 3 of pedal travel simulator 2 is able to flow on the rear side of piston 6 from one to another side of orifice disk 14. Moreover, brake fluid or fluid is able to flow out of cylinder 3 on the rear side of piston 6 through recesses 17 in the outer edge of orifice disk 14 outwardly into a circumferential groove 18 in cylinder 3 which is open on the inside and surrounds orifice disk 14. Serving as return 19, a borehole which communicates with a depressurized brake fluid storage container, which is not shown, opens into groove 18. In this way, during a stroke, piston 6 is able to displace brake fluid or fluid on its rear side out of cylinder 3 through groove 18 and return 19.

Recesses 17 in the outer edge of orifice disk 14 also prevent cylinder cover 9 from breaking or cracking when being pressed into cylinder 3, in particular if it is tempered.

Orifice disk 14 includes centering protrusions 20 on its outer edge, with the aid of which it is pressed into the annular step in the end edge forming receptacle 13 on the open side of cylinder cover 9. Centering protrusions 20 center orifice disk 14 in cylinder cover 9, and thus also in cylinder 3, and they hold orifice disk 14 for forming the sub-assembly in cylinder cover 9. On the outside, orifice disk 14 rests with its centering protrusions 20 only in spots against a circumference of the annular step in the end edge of cylinder cover 9. The contact in the circumferential direction is less than distances between recesses 17 in the outer edge of orifice disk 14. In the shown and described specific embodiment of the present invention, orifice disk 14 furthermore does not include a centering protrusion 20 between each recess 17, but only between every other recess 17.

On its opening, cylinder 3 includes an internal thread 21 in which a threaded ring 22 is screwed, which secures cylinder cover 9 pressed into the opening of cylinder 3 in the opening of cylinder 3 in the manner of a union nut. Threaded ring 22 is secured against loosening by one circumferential caulking or multiple caulkings 23 of material, surrounding the opening of cylinder 3, of hydraulic block 1 forming the housing of pedal travel simulator 2. Caulking 23 may in general be interpreted as a plastic deformation of material of hydraulic block 1.

An orifice disk, serving as a support disk 24 which transmits a spring force of piston spring 12 onto piston 6, is situated between piston spring 12 and piston 6.

Upon an actuation of the master brake cylinder, which is not shown, the master brake cylinder displaces brake fluid through connection 4 into cylinder 3 on the front side of piston 6 of pedal travel simulator 2. Piston 6 thus carries out a stroke counter to the spring force of piston spring 12 and displaces brake fluid on its rear side out of cylinder 3 through groove 18 into return 19. During a power operation of the vehicle braking system, the master brake cylinder is hydraulically disconnected from the vehicle braking system by the closing of a separating valve, which is not shown, and is connected to pedal travel simulator 2 by the opening of a simulator valve, which is not shown, in connection 4. During the power operation, the master brake cylinder serves as a setpoint generator, and a braking pressure is generated with the aid of a piston, which is not shown, of a power cylinder in a power cylinder borehole 25. The piston of the power cylinder is electromechanically driven via an external force with the aid of an electric motor via a threaded drive.

As mentioned above, hydraulic block 1 includes master brake cylinder borehole 5, which in the specific embodiment has a stepped diameter and includes circumferential grooves. A master brake cylinder, which is not shown, is pressed into master brake cylinder borehole 5, one or multiple piston(s), which are not shown, being introduced into the master brake cylinder, which are displaceable with the aid of a brake pedal, which is not shown, for an actuation of the master brake cylinder or the vehicle braking system, and the other piston or pistons are displaceable by pressure application.

For power operation, hydraulic block 1 includes power cylinder borehole 25, which is situated in a different cutting plane than pedal travel simulator 2 and of which, for this reason, only a half section is visible in FIG. 1. The section is offset in the figures in such a way that pedal travel simulator 2 is visible in an axial section, and that power cylinder borehole 25 is visible as a half section. A power cylinder, which is not shown and in which a piston is displaceably accommodated, is pressed into power cylinder borehole 25. For a power operation of the vehicle braking system, the piston is displaced with the aid of an electric motor, which is not shown, using a reducing gear and a threaded drive in the power cylinder. The electric motor is screwed to hydraulic block 1. During a power operation, the master brake cylinder, as mentioned above, serves as a setpoint generator, and a braking pressure is regulated by regulating a displacement travel of the piston in the power cylinder and/or with the aid of solenoid valves.

What is claimed is:

1. A pedal travel simulator for a hydraulic power vehicle braking system, comprising:
   a cylinder;
   a piston displaceable in the cylinder;
   a hollow cylinder cover which closes the cylinder on a rear side of the piston;
   a piston spring which is accommodated in the hollow cylinder cover and pushes against the rear side of the piston;
   an orifice disk as a stroke limiter of the piston, which rests axially against an annular step in the cylinder and is held there axially by the cylinder cover and through which the piston extends and against which an annular step of the piston strikes when the piston carries out a maximum stroke;
   a hydraulic connection on the cylinder for a master brake cylinder on a front side of the piston situated opposite the rear side;
   a circumferential groove inside the cylinder at a height of the orifice disk which forms the stroke limiter for the piston and which on the rear side of the piston is inwardly open into the cylinder; and
   a return opening into the groove.

2. The pedal travel simulator as recited in claim 1, wherein the cylinder cover seals the cylinder in a pressure-tight manner.

3. The pedal travel simulator as recited in claim 1, wherein the cylinder cover includes an annular step as a receptacle for the orifice disk which forms the stroke limiter for the piston, on an end edge facing the cylinder and in which the orifice disk is seated and held at least one of axially and radially.

4. The pedal travel simulator as recited in claim 3, wherein the annular step in the cylinder cover is less deep than the orifice disk forming the stroke limiter of the piston is thick, so that the orifice disk causes a distance between the end edge of the cylinder cover and the annular step in the cylinder against which the orifice disk rests axially.

5. The pedal travel simulator as recited in claim 3, wherein the orifice disk which forms the stroke limiter for the piston is pressed into the annular step in the cylinder cover forming the receptacle for the orifice disk.

6. The pedal travel simulator as recited in claim 1, wherein the orifice disk is fastened to the cylinder cover and holds the piston spring in the cylinder cover, so that the cylinder cover, together with the piston spring and the orifice disk forming the stroke limiter for the piston, forms an assembly.

7. The pedal travel simulator as recited in claim 1, wherein at least one of: (i) an outer edge of the orifice disk includes recesses, through which fluid is able to flow, and (ii) centering protrusions which center the orifice disk in the cylinder or in the cylinder cover.

8. The pedal travel simulator as recited in claim 1, wherein the cylinder cover is fastened to the cylinder with the aid of a threaded ring, which is screwed into an internal thread of the cylinder.

9. The pedal travel simulator as recited in claim 8, wherein the threaded ring is secured against loosening by a deformation of material of the cylinder in an area of the threaded ring.

10. A hydraulic block for a hydraulic power vehicle braking system, comprising:
    a pedal travel simulator for a hydraulic power vehicle braking system, including:
        a cylinder,
        a piston displaceable in the cylinder,
        a hollow cylinder cover which closes the cylinder on a rear side of the piston,
        a piston spring which is accommodated in the hollow cylinder cover and pushes against the rear side of the piston,
        an orifice disk as a stroke limiter of the piston, which rests axially against an annular step in the cylinder and is held there axially by the cylinder cover and through which the piston extends and against which an annular step of the piston strikes when the piston carries out a maximum stroke,
        a hydraulic connection on the cylinder for a master brake cylinder on a front side of the piston situated opposite the rear side,
        a circumferential groove inside the cylinder at a height of the orifice disk which forms the stroke limiter for the piston and which on the rear side of the piston is inwardly open into the cylinder, and a return opening into the groove;
    wherein the cylinder of the pedal travel simulator is designed as a hole in the hydraulic block.

11. The hydraulic block as recited in claim 10, wherein the hydraulic block includes at least one of a master brake cylinder borehole, and a power cylinder borehole.

* * * * *